July 6, 1926.

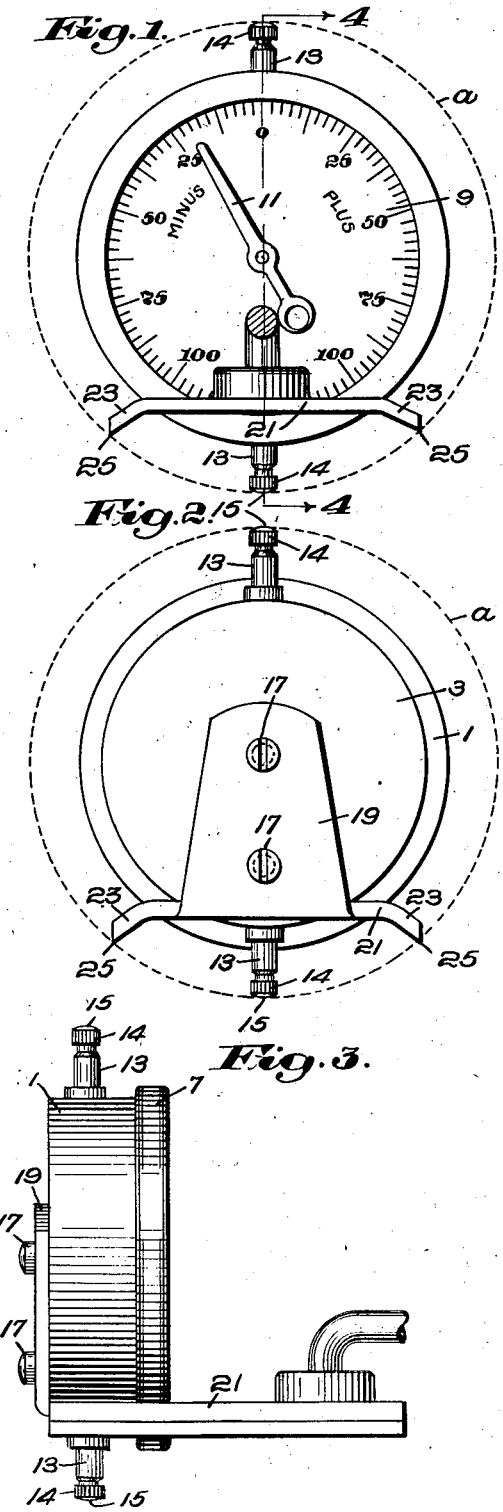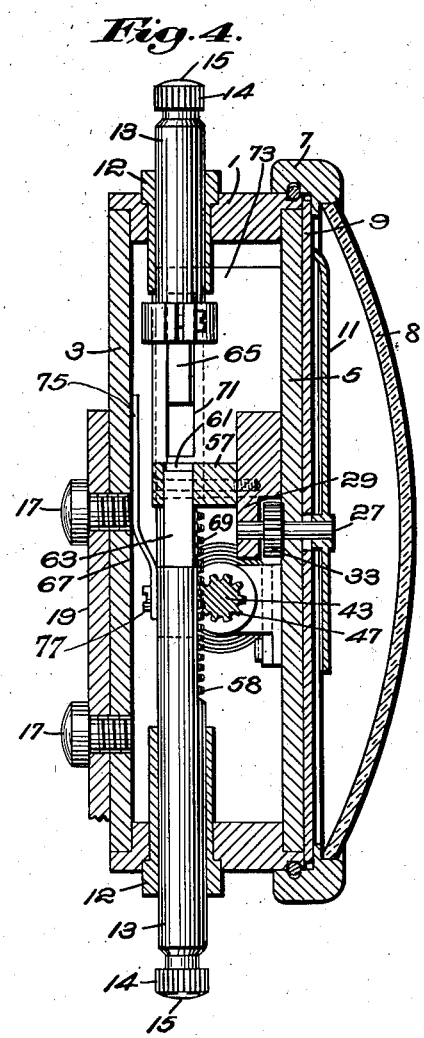

W. AMES 1,591,260

CALIPER GAUGE

Filed March 26, 1924    2 Sheets-Sheet 2

Inventor:
Warren Ames.
by Emery, Booth, Janney & Varney
Attys.

Patented July 6, 1926.

1,591,260

UNITED STATES PATENT OFFICE.

WARREN AMES, OF WALTHAM, MASSACHUSETTS, ASSIGNOR TO B. C. AMES CO., OF WALTHAM, MASSACHUSETTS, A CORPORATION OF MASSACHUSETTS.

CALIPER GAUGE.

Application filed March 26, 1924. Serial No. 701,994.

My invention relates to calipering instruments and particularly but not exclusively to one for calipering the inside diameters of cylindrical surfaces.

My invention will be best understood from the following description when read in the light of the accompanying drawings showing one specific embodiment of my invention selected for illustrative purposes, while the scope of my invention will be more particularly pointed out in the appended claims.

In the drawings:—

Fig. 1 shows the front view of a calipering instrument constructed according to my invention;

Fig. 2 shows a rear view of the instrument;

Fig. 3 shows a side elevation of the instrument;

Fig. 4 is a section on the line 4—4 of Fig. 1;

Figure 5:
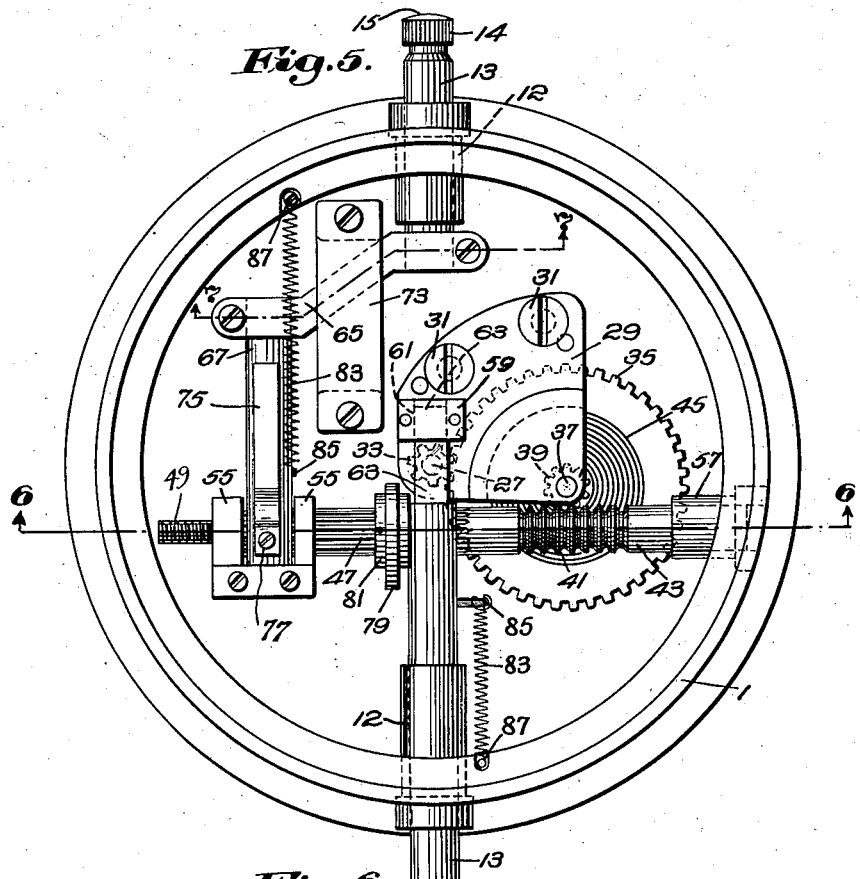
Fig. 5 is a rear view on an enlarged scale with the back plate removed.

Referring to the drawings which show the embodiment of my invention selected for illustrative purposes, I provide a frame for the operative parts of the instrument, which frame herein is in the form of a casing having the cylindrical portion 1, the bottom plate 3 and the top plate 5. The portion 1 of the casing rotatably carries a ring 7 which supports a lens 8 and to which is secured the graduated dial plate 9 so that when the ring is rotated relatively to the casing the dial plate rotates with it, thus enabling the dial plate to be adjusted angularly relatively to an indicator hand 11.

Extending through bushings 12 at diametrically opposite portions of the casing are caliper members in the form of aligned reciprocatory rods 13 which at their ends carry removable members 14 providing calipering points 15, the casing carrying mechanism hereinafter to be described for causing the indicator hand 11 to indicate the degree of separation of the calipering points.

For placing the calipering points at diametrically opposite points on the cylindrical surface $a$ whose interior diameter is to be measured I rigidly secure to the back plate 3 of the casing by means of screws 17 a tongue 19 formed integrally with and projecting upwardly from a base 21 which lies in a plane transverse to the axes of the rods 13. As clearly shown in Figs. 1 and 2 of the drawings the end portions 23 of the base are bent at an angle to the body portion thereof so as to form corners 25 which contact the walls of the cylindrical surface to be measured at opposite ends of a chord of the circle constituting a transverse section of said surface, and as the axes of the aligned rods 13 bisect this chord and are normal thereto the calipering points 15 of said rods will be placed at diametrically opposite points on the cylindrical surface.

Figure 6:
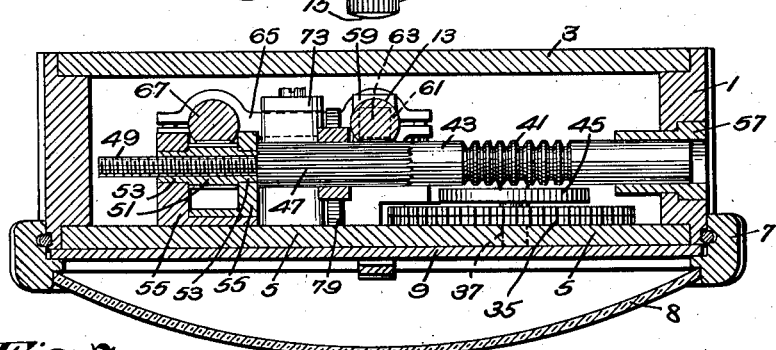
Fig. 6 is a section through the instrument on the line 6—6 of Fig. 5.
Figure 7:
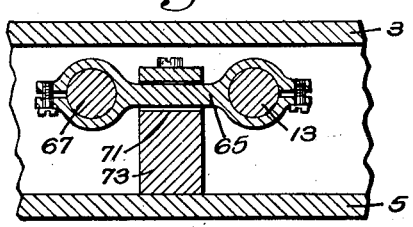
Fig. 7 is a section on the line 7—7 of Fig. 5.

Referring particularly to Figs. 4, 5, 6 and 7 it will be noted that the indicator hand 11 is carried on the end of a stem 27 which intermediate its length is journaled in the top plate 5 and has its inner end journaled in a bracket 29 secured to the top plate by means of screws 31. The stem 27 carries a gear 33 in mesh with a larger gear 35 so that when the latter is rotated the indicator hand 11 will be moved. The gear 35 is fixedly mounted on a spindle 37 which is mounted for rotation in the top plate 5 and in the bracket 29 in a manner similar to the stem 27. At its inner end the spindle 37 carries a gear 39 in mesh with a circular rack 41 formed on a rod 43, and as will be obvious when the rod 43 is reciprocated the indicator hand 11 will be turned, while rotation of the rod 43 will not affect the indicator hand. For taking up lost motion between the rack 41 and the gear 39 and between the gear 33 and the gear 35 I provide a torsion spring 45, the gear 35 for this purpose being split in a plane transverse to its axis as shown in Fig. 6, one end of the spring being secured to the adjacent half of the gear and the opposite end to a fixed part of the casing.

The rod 43 is reciprocated in response to the relative motion between the rods 13. To this end the rod 43 is formed intermediate its length with a spur gear portion 47, while its end is reduced in diameter and is screw threaded as indicated at 49. Mounted on the screw threaded portion 49 is a gear 51 of the same pitch diameter as the gear portion 47 of the rod. The end portions of the gear 51 are reduced in diameter as is indicated at 53 to form journals mounted in the brackets 55. The gear 51 supports the left hand end of the rod 43 as viewed in Fig. 6, while its right hand end is supported for reciprocation and rotation in a bushing 57 carried by the cylindrical portion 1 of the casing. It will be noted by this construction that if the rod 43 is rotated and the gear 51 does not turn the rod will be moved longitudinally in a direction depending upon its direction of rotation. It will also be noted that if the gear 51 is rotated and the rod does not turn the rod will likewise be moved longitudinally in a direction depending upon the direction of rotation of the gear 51. If both the rod and gear are rotated the reciprocation of the rod will be proportional to the algebraic difference between the angular movements of the rod and gear, which means that if the rod and gear are rotated equal amounts in the same direction no reciprocation of the rod 43 will result.

In the present embodiment of my invention one of the calipering rods 13 rotates the shaft 43, while the other rod rotates the gear 51, the arrangement being such that equal movements of the rods 13 in the same direction rotate the rod 43 and gear 51 equal amounts in the same direction. To this end the lower rod 13 as viewed in Figs. 4 and 5 is provided with rack teeth 58 meshing with the gear 47 which gear as heretofore explained is formed as part of the rod 43, the rod being securely guided in its movements and being held in mesh with the gear portion 47 by the lower bushing 12 through which the rod extends, and by the guide block 59 which has a square perforation 61 receiving the squared end portion 63 of the rod. The upper rod 13 which extends through the upper bushing 12 has secured to its inner end one end of a cross bar 65, to the other end of which is secured the end of a rod 67 having formed thereon rack teeth 69 meshing with the gear 51. The cross bar 65 extends through and is slidably supported in a slot 71 formed in a guide member 73, while the rod 67 is held in mesh with the rack by means of a plate 75 secured to the end of the rod 67 by means of a screw 77 and slidably resting against the inside surface of the back plate 3 of the casing.

From the above construction it will be observed that each rod can be moved without imparting its motion to the other rod, and that both rods can be moved the same amount in the same direction without affecting the position of the indicator hand relative to the dial, or what amounts to the same thing both rods may be held stationary and the casing reciprocated relatively to the rods without changing the relative position of the indicator hand to the dial plate. Also it will be observed that if only one rod moves the indicator hand will be moved and that if there is any difference in motion between the two rods the indicator hand will be moved a distance proportional to this difference.

For taking up the lost motion between the lower rod 13 and the gear 47 I provide a torsion spring 79 carried by a collar 81 splined or otherwise secured in fixed angular relation to the rod 43, and as will be obvious to those skilled in the art one end of the spring is attached to the collar and the other is attached to a stationary part, as for example the top plate 5. For causing the rods 13 to tend to move outwardly and normally to separate the calipering points to their full extent and to hold the latter against the surface being calipered I provide tension springs 83 which have one of their ends attached to pins 85 carried by the rod 67 and lower rod 13 respectively and the other of their ends attached at 87 to the casing.

In practice the gauge readily lends itself to determining the variation of a piece of work from a standard. When used for this purpose the calipering points will be placed between the opposite surfaces of a set gauge, and while in the gauge the dial plate may be rotated by turning the ring 7 to bring the zero reading of the dial plate under the index hand. If the instrument is then removed from the set gauge and applied to a piece of work to be measured the readings of the instrument will indicate the variation from the set gauge, the readings to the right of the zero mark indicating oversizes and the readings to the left indicating undersizes. The dial plate may be calibrated in any convenient units, as for example thousandths of an inch.

Although I have described for purposes of illustration one specific embodiment of my invention it is to be understood that within the scope of my invention wide deviations may be made therefrom without departing from the spirit of my invention.

Claims:

1. A calipering instrument for measuring the internal diameter of cylindrical surfaces and having in combination, a casing, caliper members having calipering points, means carried by said casing for positioning said calipering points diametrically opposite each other on such surfaces, said caliper members being movable relatively to each other and to said casing, indicating means carried by said casing, said indicating means having a movable member, and mechanism operated by said caliper members for moving said movable member of said indicating means a distance proportional to the algebraic difference in motion between said calipering members.

2. A calipering instrument for measuring the internal diameter of cylindrical surfaces and having in combination, a casing, caliper members having calipering points, means carried by said casing for positioning said calipering points diametrically opposite each other on such surfaces, said caliper members being movable relatively to each other and to said casing, indicating means carried by said casing, said indicating means having a movable member and a normally stationary member, the latter being adjustable relatively to said movable member, and mechanism operated by said caliper members for moving said movable member of said indicating means a distance proportional to the algebraic difference in motion between said calipering members.

3. A calipering instrument for measuring the internal diameter of cylindrical surfaces and having in combination, a casing, caliper members having calipering points, means carried by said casing for positioning said calipering points diametrically opposite each other on such surfaces, said caliper members being movable relatively to each other and to said casing, indicating means carried by said casing, said indicating means having a movable member, mechansm operated by said caliper members for moving said movable member of said indicating means a distance proportional to the algebraic difference in motion between said calipering members, and said mechanism permitting one caliper member to move without imparting motion to the other.

4. A calipering instrument for measuring the internal diameter of cylindrical surfaces and having in combination, a casing, caliper members having calipering points, means carried by said casing for positioning said calipering points diametrically opposite each other on such surfaces, said caliper members being movable relatively to each other and to said casing, indicating means carried by said casing, said indicating means having a movable member, differential mechanism operated by said caliper members for moving said movable member of said indicating means a distance proportional to the algebraic difference in motion between said calipering members, and said mechanism permitting one caliper member to move without imparting motion to the other.

5. A calipering instrument for measuring the internal diameter of cylindrical surfaces and having in combination, a casing, caliper members having calipering points, means carried by said casing for positioning said calipering points diametrically opposite each other on such surfaces, said caliper members being movable relatively to each other and to said casing, indicating means carried by said casing, said indicating means having a movable member, differential mechanism including a nut and screw operated by said caliper members for moving said movable member of said indicating means a distance proportional to the algebraic difference in motion between said calipering members, and said mechanism permitting one caliper member to move without imparting motion to the other.

6. A calipering instrument for measuring the distance between spaced surfaces and having in combination, an indicating means comprising a frame, caliper members independently movable relatively to each other and to said frame, said indicating means having a single movable member for indicating the degree of separation of said caliper members, and mechanism responsive only to relative motion of said caliper members for moving said movable member and permitting bodily movement of said indicating means relatively to both caliper members without affecting the reading of said indicating means while said caliper members are in contact with opposed relatively stationary surfaces.

7. A calipering instrument for measuring the distance between spaced surfaces and having in combination, an indicating means comprising a frame, caliper members independently movable relatively to each other and to said frame, said indicating means having a graduated dial and a pointer only one of which is movable for indicating the degree of separation of said caliper members, mechanism responsive only to relative motion of said caliper members for operating said indicating means comprising a pair of gears one of which is operatively connected for rotation to one of said caliper members and the other of which is operatively connected for rotation to the other of said caliper members, and means responsive to the algebraic difference in motion of said gears for actuating movement of said indicating means.

8. A calipering instrument for measuring the distance between spaced surfaces and having in combination, an indicating means comprising a frame, caliper members independently movable relatively to each other and to said frame, said indicating means having a graduated dial and a pointer only one of which is movable for indicating the degree of separation of said caliper members, mechanism connecting both caliper members to said indicating means, said mechanism comprising a pair of members one of which is operatively connected for rotation to one of said caliper members and the other of which is operatively connected for rotation to the other of said caliper members, and means for transmitting to said indicating means a motion proportional to the algebraic difference in motion of the members of said pair of members.

9. A calipering instrument having in combination, indicating means having a movable indicator, a pair of caliper members, mechanism connecting said caliper members to said indicator for moving the latter a distance proportional to the algebraic difference in motion of said caliper members, and said mechanism permitting motion of either of said caliper members without transmitting said motion to the other caliper member and permitting bodily movement of said indicating means relatively to both caliper members without affecting the reading of said indicating means while said caliper members are in contact with opposed relatively stationary surfaces.

10. A calipering instrument having in combination, indicating means having a movable indicator, a pair of caliper members, differential mechanism comprising rotary gears connecting said caliper members to said indicator for moving the latter a distance proportional to the algebraic difference in motion of said caliper members, and said mechanism permitting motion of either of said caliper members without transmitting said motion to the other caliper member.

11. A calipering instrument, having in combination, indicating means having a movable indicator, a pair of caliper members, mechanism connecting both caliper members to said movable indicator; said mechanism transmitting to said indicator no motion when said caliper members move equal distances in the same direction, said mechanism also transmitting to said indicator a motion proportional to the motion of either caliper member if the other remains stationary, and a motion proportional to the algebraic difference in motion of said caliper members if both move and permitting bodily movement of said indicating means relatively to both caliper members without affecting the reading of said indicating means while said caliper members are in contact with opposed relatively stationary surfaces.

12. A calipering instrument, having in combination, indicating means having a movable indicator, a pair of caliper members, and differential mechanism comprising a pair of gears one of which is actuated by one of said caliper members and the other of which is actuated by the other of said caliper members for transmitting a motion proportional to the algebraic difference in motion of said caliper members to said indicator.

13. A calipering instrument, having in combination, indicating means having a movable indicator, a pair of caliper members, differential mechanism actuated by both caliper members for transmitting a motion proportional to the algebraic difference in motion of said caliper member to said indicator, said differential mechanism comprising a screw rotated in response to motion of one caliper member and a cooperating nut rotated in response to motion of the other caliper member.

14. A calipering instrument, having in combination, indicating means having a movable indicator, a pair of caliper members, a screw mounted for longitudinal reciprocation, means for transmitting reciprocatory motion of said screw to said indicator, a rotatable nut on said screw, means restraining said nut against longitudinal reciprocation, and means for causing motion of one caliper member to rotate said screw and motion of the other caliper member to rotate said nut.

15. A calipering instrument, having in combination, indicating means having a movable indicator, a pair of caliper members, a rotatable screw threaded member carrying a relatively rotatable nut member, means for restraining one of said members against longitudinal motion and permitting the other to move longitudinally, means for transmitting the motion of such longitudinally movable member to said indicator, and means for causing motion of one of said caliper members to rotate said screw and motion of the other caliper member to rotate said nut.

16. A calipering instrument, having in combination, indicating means having a movable indicator, a pair of caliper members, a screw threaded member, a rotatable gear for rotating said screw threaded member, a rack cooperating with said rotatable gear and operated by one of said caliper members, a second gear cooperating with a second rack operated by the other of said caliper members, said second gear having an axial screw threaded perforation receiving said screw threaded member whereby said second gear forms a nut cooperating with said screw threaded member, means for holding one of said gears against longitudinal reciprocation and permitting the other gear to reciprocate longitudinally, means for transmitting the longitudinal motion of the longitudinally reciprocable gear to said indicator, and equal motions of said racks in the same direction rotating both gears through equal angles in the same direction.

17. A calipering instrument, having in combination, indicating means having a movable indicator, a pair of caliper members, a screw threaded member, a rotatable gear for rotating said screw threaded member, a rack cooperating with said rotatable gear and operated by one of said caliper members, a second gear cooperating with a second rack operated by the other of said caliper members, said second gear having an axial screw threaded perforation receiving said screw threaded member whereby said second gear forms a nut cooperating with said screw threaded member, means for holding one of said gears against longitudinal reciprocation and permitting the other gear to reciprocate longitudinally, a third rack actuated by the reciprocation of the longitudinally movable gear, and means for transmitting the motion of said third rack to said indicator.

18. A calipering instrument, having in combination, indicating means having a movable indicator, a pair of caliper members, a rotatable member, a rotatable circular rack for actuating said indicator, a screw threaded member, a second rotatable member forming a nut for said screw threaded member, means restraining one rotatable member against longitudinal motion and permitting the other to move longitudinally, the one having longitudinal motion being connected to said circular rack, and means for causing equal motions of said caliper member to rotate said rotatable members the same amount.

19. A calipering instrument, having in combination, indicating means having a relatively movable pointer and a graduated member one of which is normally stationary relatively to said indicating means, a pair of caliper members movable relatively to each other and to said indicating means, mechanism responsive to motion of said caliper members for causing said indicating means to indicate the degree of separation of said caliper members, and said mechanism permitting bodily movement of said indicating means relatively to both caliper members without affecting the reading of said indicating means.

In testimony whereof, I have signed my name to this specification.

WARREN AMES.